(12) United States Patent
Pancheri

(10) Patent No.: US 11,263,672 B2
(45) Date of Patent: Mar. 1, 2022

(54) FUELING STATION NETWORK MANAGEMENT SYSTEM

(71) Applicant: Look, Inc., Los Angeles, CA (US)

(72) Inventor: Rebecca Pancheri, Los Angeles, CA (US)

(73) Assignee: LOOK, INC., Los Angeles, CA (US)

( * ) Notice: Subject to any disclaimer, the term of this patent is extended or adjusted under 35 U.S.C. 154(b) by 291 days.

(21) Appl. No.: 16/058,839

(22) Filed: Aug. 8, 2018

(65) Prior Publication Data

US 2019/0050918 A1 Feb. 14, 2019

Related U.S. Application Data

(60) Provisional application No. 62/542,632, filed on Aug. 8, 2017.

(51) Int. Cl.
*G06Q 30/02* (2012.01)
*B67D 7/04* (2010.01)
*G06Q 50/06* (2012.01)

(52) U.S. Cl.
CPC ........... *G06Q 30/0282* (2013.01); *B67D 7/04* (2013.01); *G06Q 50/06* (2013.01)

(58) Field of Classification Search
None
See application file for complete search history.

(56) References Cited

U.S. PATENT DOCUMENTS 10,140,645 B2 * 11/2018 Driscoll ............. G06Q 30/0631
10,140,785 B1 * 11/2018 Cox .......................... G01F 9/02
2003/0126150 A1 * 7/2003 Chan .................... G06F 16/9537
2007/0290039 A1 * 12/2007 Pfleging .................. G07C 5/008
  235/384
2009/0111462 A1 * 4/2009 Krinsky ................ H04W 24/08
  455/423
2009/0276368 A1 * 11/2009 Martin .................... G06Q 40/02
  705/36 R
2010/0106514 A1  4/2010 Cox
2010/0161507 A1 * 6/2010 McKenzie, III ...... G01S 5/0027
  705/347
2014/0012924 A1 * 1/2014 Jagernauth ............. G06Q 50/10
  709/206

(Continued)

OTHER PUBLICATIONS

System for Automated Vehicle Fueling and Tracking, IP.com,IPCOM000239175D, Oct. 20, 2014 (Year: 2014).*

(Continued)

*Primary Examiner* — Oluseye Iwarere
(74) *Attorney, Agent, or Firm* — von Briesen & Roper, s.c.

(57) ABSTRACT

Fueling station network management systems and methods generate rating metrics and/or rankings regarding one or more fueling stations based, in part, on user fueling experience feedback data. A user device can include an application through which user feedback can be received and communicated to a data server. Additionally, the fueling station can also provide information, such as a status of the fueling station, to the data server. The data server can provide suggested fueling stations to a user based on the user's location and/or the user feedback and fueling station data. An incentivization system can be included to incentivize users to provide feedback regarding their fueling experience.

20 Claims, 10 Drawing Sheets

(56) References Cited

U.S. PATENT DOCUMENTS

| | | | | |
|---|---|---|---|---|
| 2014/0278513 | A1* | 9/2014 | Prakash | G06Q 30/0601 705/2 |
| 2014/0312839 | A1* | 10/2014 | Uyeki | B60L 53/64 320/109 |
| 2015/0051829 | A1* | 2/2015 | Gearhart | G01C 21/3682 701/467 |
| 2015/0154638 | A1* | 6/2015 | Burlingham | G06Q 30/0259 705/14.57 |
| 2015/0169044 | A1 | 6/2015 | Grossman | |
| 2016/0026920 | A1* | 1/2016 | Sullivan | G06F 16/9535 706/11 |
| 2016/0035001 | A1* | 2/2016 | Driscoll | G06Q 30/0631 705/26.7 |
| 2016/0232725 | A1* | 8/2016 | Plowman | G06F 16/334 |
| 2016/0275632 | A1* | 9/2016 | Woo | G06Q 30/0631 |
| 2016/0375780 | A1 | 12/2016 | Penilla et al. | |
| 2017/0098197 | A1* | 4/2017 | Yu | G06Q 30/02 |
| 2017/0336920 | A1* | 11/2017 | Chan | G06Q 10/10 |
| 2019/0050918 | A1* | 2/2019 | Pancheri | B67D 7/04 |

OTHER PUBLICATIONS

J. D. Porter and D. S. Kim, "An RFID-Enabled Road Pricing System for Transportation," in IEEE Systems Journal, vol. 2, No. 2, pp. 248-257, Jun. 2008, (Year: 2008).*

V. D. Stanciu, C. Dobre and V. Cristea, "Context-Based Service for Intelligent Public Transportation Systems," 2014 Eighth International Conference on Complex, Intelligent and Software Intensive Systems, 2014, pp. 353-358, (Year: 2014).*

International Preliminary Report on Patentability dated Feb. 20, 2020, International Application No. PCT/US2018/045855, International filing date Aug. 8, 2018.

International Search Report and Written Opinion dated Nov. 26, 2018, International Application No. PCT/US2018/45855, International Filing Date Aug. 8, 2018.

* cited by examiner

730

FUELING SUMMARY    DATE/TIME $/KG | KGs | TOTAL

STATUS  CARD  FILL  RECEIPT  NOZZLE
☐       ☐     ☐     ☐        ☐

RANGE            RATING
                 ☐☐☐☐☐

ADD MILEAGE 000              000000
TRIP             ODOMETER

SAVE

FIG. 7C

FUELING STATION NETWORK MANAGEMENT SYSTEM

CROSS-REFERENCE TO RELATED APPLICATIONS

This patent application claims the benefit of and priority to U.S. Provisional Patent Application Ser. No. 62/542,632 filed on Aug. 8, 2017 entitled "FUELING STATION NETWORK MANAGEMENT SYSTEM," the contents of which are hereby incorporated by reference in their entirety.

BACKGROUND

Vehicles require a fuel as the source of energy for powered movement. Currently there are a variety of different fuel types that can be stored within the vehicle to provide this energy. With the advent of alternative fuels, the fuel types for vehicles are expanding from the traditional chemical fuels of gasoline and diesel to the newer fuels of electricity and hydrogen. With the new fuel types, infrastructure is being developed to provide consumers with access to these new fuel types.

Each fuel type has different delivery requirements and this can lead to a variety of unknown problems and issues with fueling vehicles. As some of the fuel types do not have widespread adoptions, the issues associated with the infrastructure to supply those fuel types may not be as common or well known. This developing industry can benefit from a fueling station network management system that can provide insight to the user's fueling experience and the issues associated with fueling.

BRIEF DESCRIPTION OF THE DRAWINGS

FIGS. 7A-7D are example screenshots of an example user application.

DETAILED DESCRIPTION

Fueling stations network management systems and methods are described herein. The systems and methods acquire user input regarding a user's fueling experience at a fueling station and information regarding one or more fueling stations, to generate a status of the one or more fueling stations and rating metrics, ranking data, and/or other metrics regarding performance of the one or more fueling stations and/or user's fueling experiences associated with the one or more fueling stations. The fueling station network management system can provide the rating metrics and/or ranking data to one or more user's to assist with selecting a fueling station for fueling a vehicle. Additionally, the rating metrics and/or ranking data can be provided to one or more external sources, such as a vehicle manufacturer. The fueling stations network management systems and methods can also include an incentivization system to incentivize users to provide feedback regarding the one or more fueling stations and/or the user's fueling experience.

Figure 1:
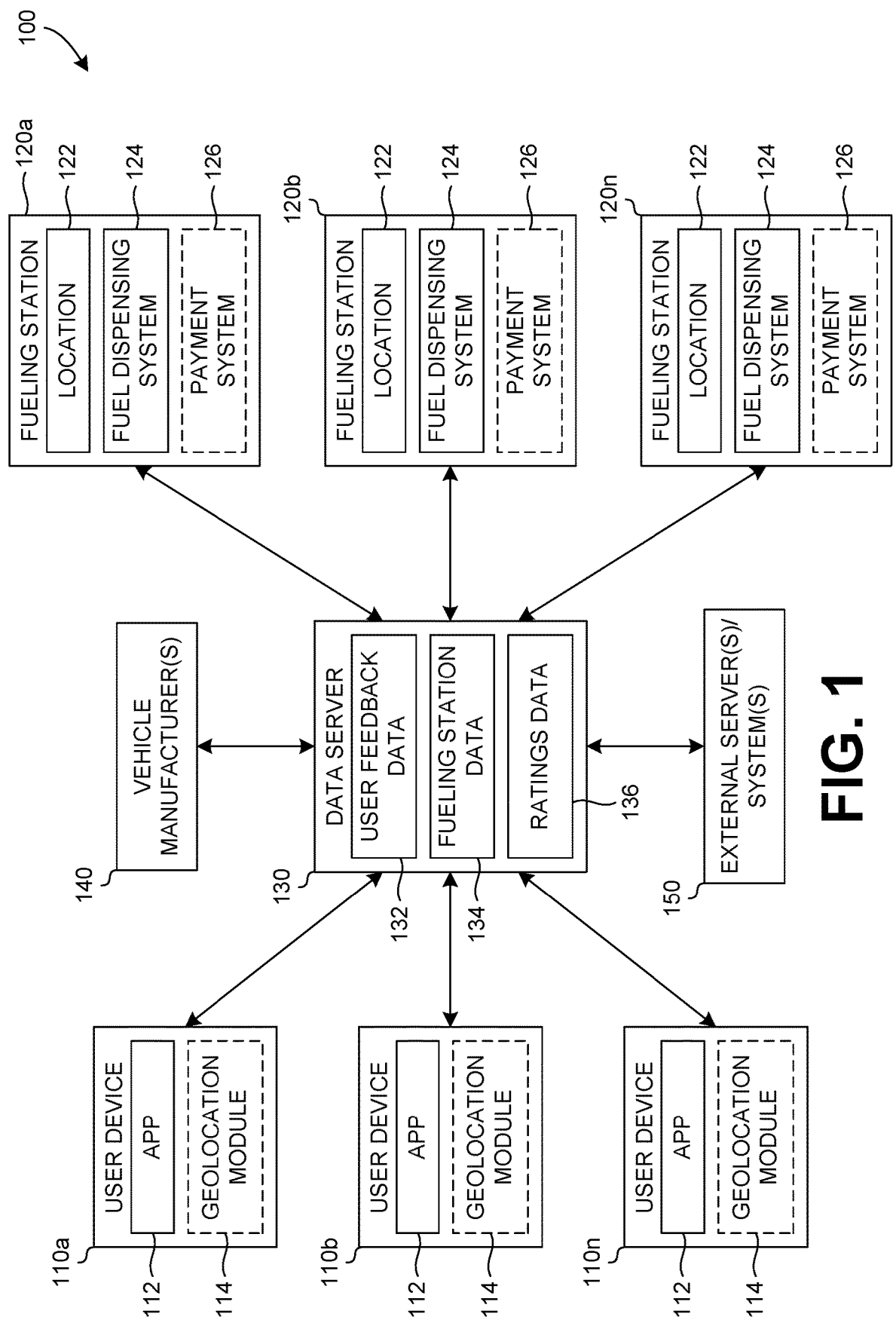
FIG. 1 illustrates an example fueling network management system.

FIG. 1 illustrates an example fueling station network management system 100. A user device 110a, having an app, or software, 112 installed thereon, can be used to collect various data regarding a user's experience at a fueling station 120a. The collected data can be transmitted to a data server 130 where various analyses and evaluations of the collected data can be performed. The data server 130 can also share the collected data or analysis with an external server(s) or system(s) 150 and/or with other interested parties, such as a vehicle manufacturer(s) 140.

Multiple users and their user devices, 110a, 110b . . . 110n, can interact with the data server 130 to provide data regarding fueling events. Each user device 110a-110n includes an app 112 that a user can interact with to provide data and/or information, relating to the user's fueling experience, to the data server 130. Data transmissions between the user device 110a-110n and the data server 130 can include a unique identifier that can be associated with a particular user, the user device 110a-110n and/or another user or user device 110a-110n characteristic. Additionally, such communications between the user device 110a-110n and the data server 130 can be secured or encrypted.

The user device 110a-110n can also include an optional geolocation module/system 114 that can determine the location of the user device 110a-110n. Such location information can be provided to the app 112 and/or the data server 130 to indicate a location of the user device 110a-110n. The location information supplied by the geolocation module 114 to the app 112 and/or the data server 130 can trigger events at the server 130 and/or the app 112 based on the location of the user device 110a-110n, such as displaying a prompt on the user device 110a-110n to request user input.

A user's fueling experience will take place at a fueling station 120a-120n having a location 122 and a fuel dispensing system 124. The fueling station 120a-120n can be a self-serve station, requiring the user to dispense their own fuel, or an attended station that has an attendant who dispenses fuel for the user. In either case, the fueling station 120a-120n may have some or no personnel at the fueling station 120a-120n location 122.

The fuel dispensing system 124 can be dependent on the type of fuel being dispensed or supplied at the fueling station 120a-120n. Different types of fuel, such as liquid gasoline, electricity, compressed hydrogen or other fuels, can require different fuel dispensing systems 124 based on the fuel type to be dispensed. For example, a fuel dispensing system for dispensing liquid fuel can have different components and subsystems than a fuel dispensing system for dispensing gaseous fuel, such as hydrogen. That is, each fuel type can present unique and varying requirements of the fuel dispensing system 124.

Each fueling station 120a-120n can also include an optional payment system 126 by which a user can pay for the fuel dispensed. Such payment systems can include one or more electronic and/or physical payment systems for facilitating the payment exchange. Additionally, the payment system 126 can interact with the fuel dispensing system 124, such as to monitor the fuel dispensed and prevent theft of fuel from the fuel dispensing system 124.

The app 112, on a user device 110a-110n, provides the user the ability to capture their observations and/or additional data regarding their fueling experience at the fueling station 120a-120n. The user provided feedback can include information regarding the fueling station 120a-120n, any problems the user experienced during fueling and/or other information related to the fueling experience. This feedback can be collected at the data server 130 for analysis, distribution and/or responsive action, such as to rate or review individual fueling stations 120a-120n and/or to remedy user noted deficiencies or errors at a fueling station 120a-120n.

The data server 130 can receive user input through the app 112 on the user device 110a-110n, with such input being stored as user feedback data 132. The user feedback data 132 can include information and/or data regarding a user's fueling experience at a fueling station 120a-120n. The user can be prompted by the app 112 on the user device 110a-110n to provide the user feedback data 132 or the user can deliberately interact with the app 112 to provide such user feedback data 132. The user feedback data 132 can be collected in a variety of means, such as by a user's answers to a series of questions or a survey, by affirming data provided by a previous user (for example, confirming the price of fuel logged by another user), by freeform user textual input and/or a combination of data collection means. Additionally, the user feedback data 132 may include an associated identity of the user and/or identity of the fueling station 120a-120n at which the fueling event occurred. Confidential, identifiable and/or personal user information can be stored using various data storage means and strategies to protect the user information.

Fueling station data 134 can also be received and/or stored by the data server 132. Fueling station data 134 can include the identity of a fueling station 120a-120n, a location 122 of the associated fueling station 120a-120n, a status of the fueling station 120a-120n and/or other data or information regarding the fueling station 120a-120n. The status of a fueling station 120a-120n can indicate the availability of the fueling station 120a-120n, such as if the station is open, the type(s)/subtype(s) of fuel being dispensed at the fueling station 120a-120n, the availability of fueling point(s) at the fueling station 120a-120n, fueling station 120a-120n business hours and/or other information pertinent to the availability of the fueling station 120a-120n. For example, a hydrogen fueling station can dispense subtypes of hydrogen fuel, such as hydrogen gas at 35 MPa and 70 MPa, and the fueling station status can indicate if one or more of the subtypes of hydrogen fuel is available. Additionally, the station status can indicate the source of the fuel. For example, the station status can indicate if the hydrogen fuel being dispensed is sourced or produced using renewable energy sources. The fueling station data 134 can be provided and/or communicated to the data server 130 by the fueling station 120a-120n, by an operator of the fueling station 120a-120n, by direct entry and/or from other sources.

The data server 130, or another system and/or person, can assess, evaluate, or otherwise use the collected user feedback data 132 and/or fueling station data 134 to generate, calculate, or create ratings data 136. The ratings data 136 can provide the user, and others, indications regarding the status, usability and/or other information regarding individual fueling stations 120a-120n. The user can, if so chosen, utilize this ratings data 136 during their process of selecting a fueling station 120a-120n for a fueling event.

Ratings data 136 can also be applied to other characteristics of the fueling stations 120a-120n for which data is provided. For example, an operator can manage multiple fueling stations 120a-120n and the ratings data 136 can include a rating of the operator along with rating data 136 related to each fueling station 120a-120n managed or operated by the operator.

Additionally, the collected user feedback data 132, the fueling station data 134 and/or other data collected by or accessible to the data server 130 can be used by the data server 130 to analyze and/or evaluate a variety of aspects and characteristics related to fueling events. Such analysis and/or evaluations can be performed by the data server 130 or other system/person and can include time based analysis and/or evaluation to extrapolate trends and/or other information contained within the data on and/or accessible to the data server 130.

The data server 130 can also include various app 112 management functions. The management functions can include user identification, user information, app functionality, user's app permissions, user preferences, user app updates and various other aspects and/or data regarding the app 112. User app updates can include updating the information regarding fueling stations 120a-120n, such as new or additional stations 120a-120n, of the app 112 on the user device 110a-110n and other information and/or functionality updates. The app 112 on the user device 110a-110n can communicate with the data server 130 to receive software updates and/or other information or data that can change the operation of the app 112 on the user device 110a-110n.

Data and/or other information can be shared between the data server 130 and a vehicle manufacturer 140, an external system/server 150 and/or others. The exchange of data from the data server 130 can allow other entities to provide additional data for use in evaluations and/or analyses performed by the data server 130 and/or to allow the other entities access to the data of the data server 130 in order to perform their own analysis and/or evaluation of the data.

The user feedback data 132 can include a vehicle associated with the user and their feedback data 132. A vehicle manufacturer 140 can obtain data from the data server 130, such as that related to vehicles they manufacture, in order to perform various analyses and/or evaluations. Such analyses and/or evaluations can be used by the vehicle manufacturer 140 to provide insight into post-sale vehicle use. This in-turn can help the manufacturer 140 in their work to increase sales of their vehicles, such as by assisting or mitigating recurring fueling issues experienced by a user operating a vehicle made by the manufacturer 140. Additionally, such information can also be used in the design and manufacturing of a vehicle by the vehicle manufacturer 140 to improve a user ownership experience of the vehicle with regards to users fueling events.

A vehicle manufacturer 140 may be interested in other information that can be obtained the through the fueling station network management system 100, such as user demographics, user fueling patterns, user location information and/or data regarding other vehicle manufacturers. The fueling station network management system 100 can contain a variety of data, regarding users, fueling stations, user vehicles and logged fueling events, that can be analyzed and evaluated by the vehicle manufacturer 140. For example, a vehicle manufacturer 140 can analyze the user fueling patterns and user location information of users having vehicles manufactured by the vehicle manufacturer 140. This information can be used to assess the fueling infrastructure needed to adequately service those users to assist the vehicle manufacturer 140 with vehicle adoptions and customer loyalty. Additional analysis of user data associated with a vehicle manufacturers competitors can assist the vehicle manufacturer with consumer insight to gain an advantage over the other vehicle manufacturers.

Figure 2:
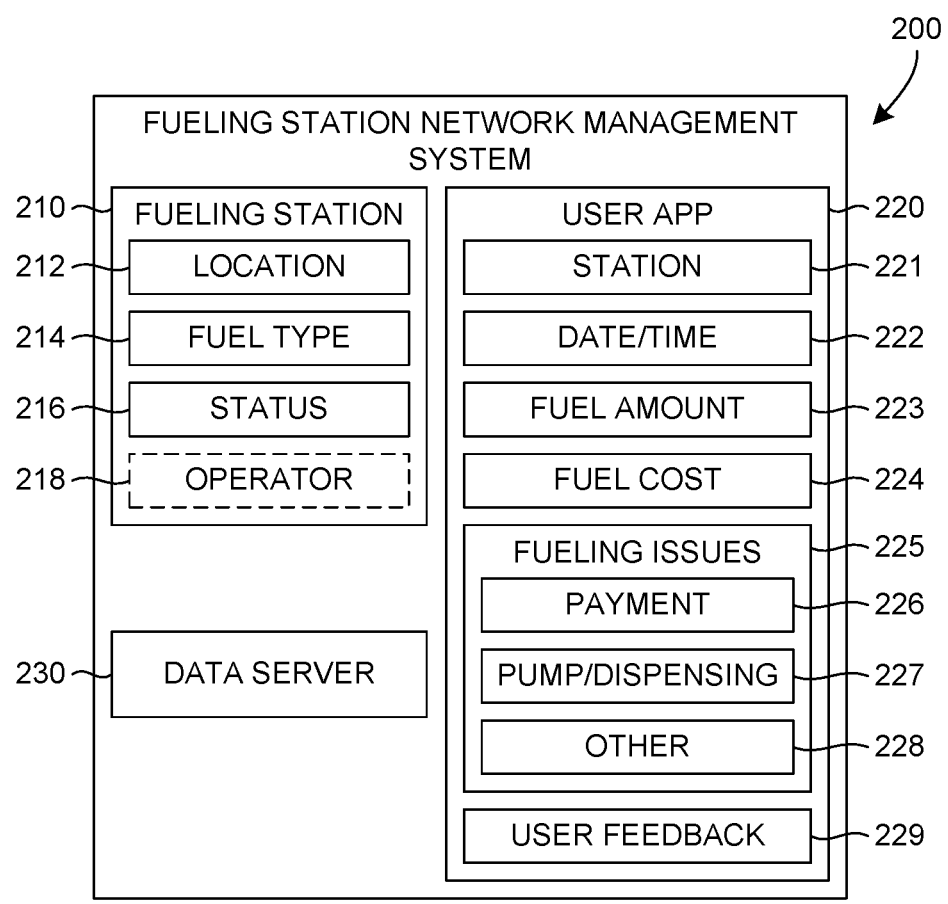
FIG. 2 is a block diagram of an example fueling station network management system.

FIG. 2 is a block diagram of an example fueling station network management system 200. The fueling station network management system 200 includes one or more fueling stations 210 and a user app, or application, 220. A user can interact with the user app 220 to input information regarding an individual fueling event at a particular fueling station 210. Alternatively, or additionally, the various information, features and/or functions of the user app 220 can be accessed through alternative or additional means, such as through a webpage or other interface through which a user can access the fueling station network management system 200.

The fueling station 210 includes a location 212 associated with the physical location of the fueling station 210, a fuel type 214 supplied, a status 216 of the station, optionally, an operator 218 of the fueling station 210 and/or other information regarding the fueling station 210. The fuel type 214 of the fueling station 210 can include one or more fuel types, such as gasoline, diesel, natural gas, hydrogen gas, electricity and/or other vehicle fuel or energy sources. Each of the fuel types can also include one or more subtypes, which can have unique and/or specific requirements for storage and/or dispensing. Example subtypes can include the varying octane ratings of gasoline, such as 87 RON (Research Octane Number), 89 RON and 91 RON, and varying pressures of a hydrogen, such as H35 and H70, hydrogen gas pressurized to 35 MPa and 70 MPa, respectively. Additionally, the fueling station 210 can have a status 216 associated with it, such as an open, closed or other status. An operator 218 of the fueling station 210 can include a parent company or organization which owns and/or manages the fueling station 210.

The user app 220 can include various inputs to allow the user to provide data and/or information regarding their fueling event at a particular fueling station 210. The user app 220 can include inputs for the station 221, date/time 222 of the fueling event, the fuel amount 223 dispensed, the fuel cost 224, fueling issues 225 experienced by the user during the event, and other user feedback 229. The data collected through the user app 220 can be transmitted to a data server 230 for storage and/or processing.

The station 221 can include the location, identity and/or other information regarding the fueling station 210. This information can be inputted by the user by selecting the fueling station 210 from a pre-populated list of fueling stations, entering the location manually, searching for the fueling station 210, received from the fueling station 210 directly via a communication channel and/or by other means. For the pre-populated list of fueling stations and searching for the fueling station 210, such functions can be conducted by the data server 230, with the user app 220 acting as an interface for the exchange of data between the data server 230 and user app 220.

The date/time 222 related to the fueling event at the fueling station 210 can be logged by the user app 220 using the included clock of the user device on which the user app 220 is installed. This input can be pre-populated using the aforementioned technique and can also be editable allowing a user to input feedback regarding a past fueling event using the user app 220. Additionally, the user app 220 can contain restrictions with regards to the elapsed time allowed for a user to provide feedback regarding a past fueling event. These restrictions can prevent a user from providing feedback for a past fueling event that may be incorrect due to the time that has elapsed since the event occurred. Further, the data server 230 can contain rules/processes to account for user recollection errors based on the date/time 222 of the fueling event and the time the submitted user feedback is received at the data server 230.

Fuel amount 223 is the amount of fuel dispensed during the fueling event being logged by the user through the user app 220. The fuel amount 223 can include a means for the user to adjust the units in which the fuel amount 223 is inputted, such as in gallons, liters, kilograms, etc. The unit options provided to the user for expressing the fuel amount 223 can also be based on the location of the fueling station 210 and/or a location of the user device associated with the user app 220. Additionally, the fuel amount 223 can include an associated fuel type for the user to select, such as gallons of gasoline, liters of diesel, kilograms of hydrogen, etc.

Fuel cost 224 can be inputted by the user as a cost per unit of fuel, such as dollars per gallon, etc., or can be inputted as a total cost of the fuel dispensed, from which the cost per unit fuel can be calculated. If the fuel cost 224 provided by the user is a total cost of the fuel dispensed, the cost per unit of fuel can be calculated using the total fuel cost and the fuel amount 223. The data server 230 and/or the user app 220, if so desired, can account for taxes and fees associated with the fuel cost 224 in order to calculate, or obtain, an actual fuel cost 224. Additionally, the fueling station 210 and user app 220 can interact through a communication means to allow the fueling station 210 to provide the user app 220 with the fuel amount 223 and/or the fuel cost 224.

For example, the user app 220, through the user device on which the user app 220 is installed, can interact with the fueling station 210 and/or other features/elements of the fueling station network management system 200. Such interaction can include payment activities whereby the user can pay for the dispensed fuel through the user app 220. The payment can be executed electronically and/or can include a physical component, such as a contactless payment method. Additionally, the user app 220 and/or the fuel station network management system 200 can include functionality to allow another party to credit the user with a fuel reward, such as an amount of fuel at no or reduced cost to the user, and to track this fuel reward and its usage. This functionality can allow a vehicle manufacturer, fueling station 210 and/or another party to reward or gift a user(s) with a fuel reward. Additionally, the fuel reward can be provided as an incentive for user interaction with and/or use of the user app 220.

Fueling issues 225 can include problems, difficulties, and/or other events that occurred during a user's fueling event at a fueling station 210. Common fueling issues 225 can include issues with payment 226, the pump/dispensing 227 equipment/system, and/or other issues 228. The payment 226 and/or the pump/dispensing 227 issues can be presented to the user as pre-populated lists of issues from which the user can select.

Issues with payment 226 can include malfunctioning payment systems, such as defective bank card readers, which can inconvenience and delay a user or require the user travel to a different fueling station 210. The user can further indicate if such issues with payment 226 prevented them from receiving fuel at the fueling station 210 or if the issues 226 were not so severe as to prevent the fueling event from occurring.

Issues with the pump/dispensing 227 system can include malfunctioning pumps or dispensing systems that prevent or hinder fueling by the user. Additionally, the pump/dispensing 227 issues can be related to the type of fuel being dispensed and the challenges and/or requirements for handling the fuel type. For example, compressed gas fuels are pressurized and can be stored at reduced temperatures, or experience a pressure change, that can cause ice formation on the pump/dispensing equipment that can hinder or prevent fueling. In the case of hydrogen fuel, the dispensing nozzle can freeze to the vehicle fuel receptacle and a user can attempt to dislodge the dispensing nozzle using force. The applied force can damage the fueling nozzle causing the fueling nozzle to incorrectly or inaccurately dispense fuel during future fueling events and/or necessitate the replacement of the damaged fueling nozzle. Using the example of hydrogen fuel, the fuel nozzle used to dispense the hydrogen gas can contain an infrared (IR) sensor that is used to measure the current fuel level in the vehicle tank. If a user forces the detachment of a frozen nozzle from their vehicle fuel receptacle, the IR sensor and/or the connections thereto can be damaged due to the user exerted force. The damage to the IR sensor and/or its connections can cause the fueling system to dispense hydrogen gas in a reduced capacity, such as limiting the pressure and/or amount of hydrogen fuel dispensed into the vehicle, to prevent over-pressurization and/or other unsafe situations. Alternatively, the damage to the IR sensor and/or its connections can require the replacement of the nozzle to reestablish the full fueling capabilities of the fueling point. Users can provide feedback regarding such issues so that remedies can be taken to prevent, correct and/or mitigate the issues for future fueling events.

Other 228 issues can include any other user provided information regarding issues that impacted the user's fueling event. These can include other 228 issues not related to payment 226 and/or the pump/dispensing 227 issues, or issues not pre-populated by the user app 220 in those categories. The other 228 issues can be a text entry field allowing the user to provide information regarding the issue.

User feedback 229 can be presented as a field allowing a user to provide thoughts and/or comments related to the fueling event. The user feedback 229 can be inputted by the user as text, can be presented as a rating scale asking the user to provide a rating, or other feedback system or means. Optionally, the user can also be presented the opportunity to include photos or video recordings as part of their user feedback. The visual feedback data can assist others, such as a fueling station operator, with determining the nature of a malfunction or error associated with the fueling event.

Data collected through the user app 220 can be transmitted to, stored, and/or processed by the data server 230. Multiple users and their fueling events can be compiled to evaluate and/or analyze fueling stations 210 and/or other aspects of user fueling events. This analysis can include evaluation of specific fueling stations 210 and/or a fueling station operator for recurring and/or common fueling issues. Such analysis can be viewed by users for use in their decision regarding a fueling station 210 to visit to dispense fuel. Additionally, the fueling station 210 can, optionally, communicate with the data server 230 to provide information, such as a status 216 of the fueling station 210, which the data server 230 can make available to the user through the user app 220.

Figure 3:
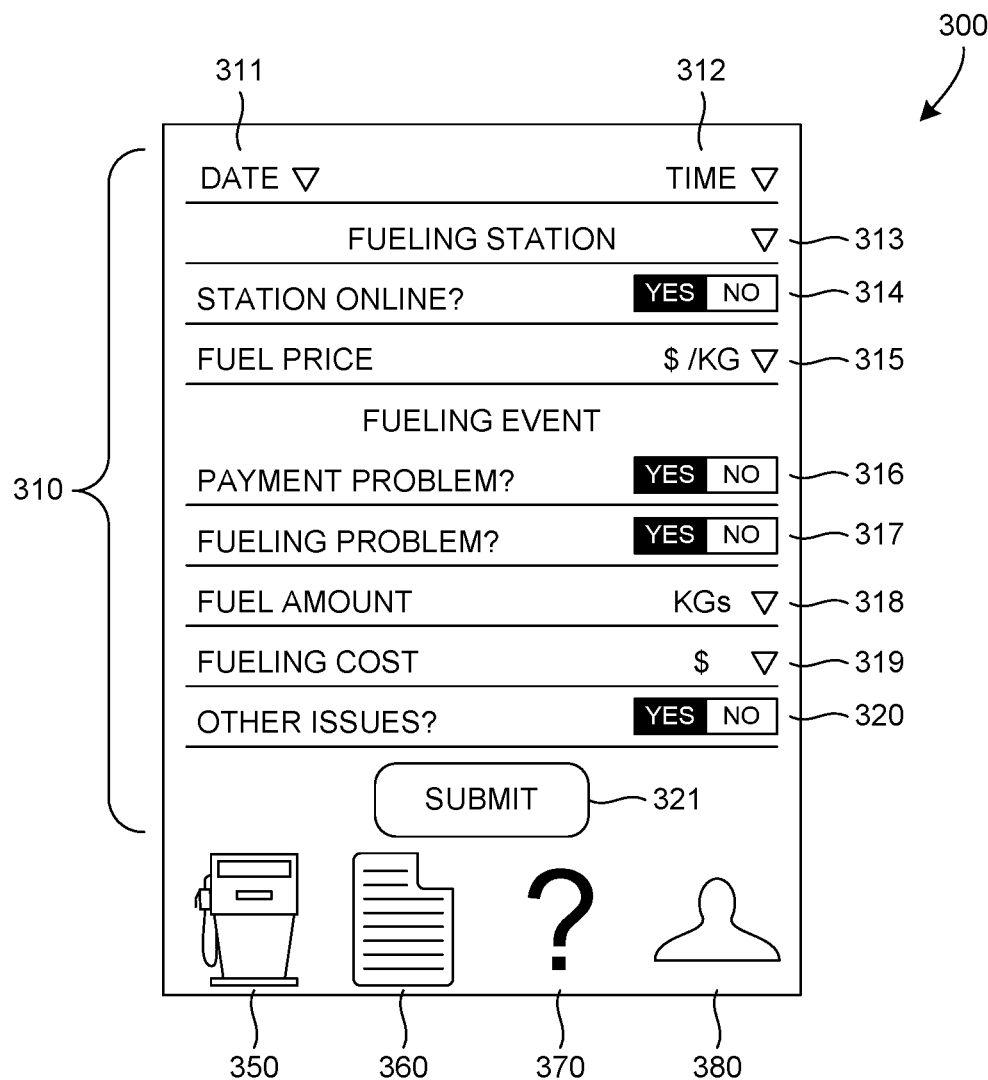
FIG. 3 is an example screenshot of an example user app interface.

FIG. 3 is an example screenshot of an example user app interface 300. The user app interface 300 can include a main portion 310 that includes various inputs for a user to provide fueling event feedback. Additional menu icons, such as a fueling event icon 350, history icon 360, help icon 370 and user icon 380, can be presented in the user app interface 300 to allow a user to navigate through the various functions of the app. Each of the various functions, 350, 360, 370 and 380, can present the user various screens/interfaces in the main portion 310 related to the selected function. Further menu icons can be included, either by the user, the app and/or the fueling station network management system. A further menu icon can include a list of frequently visited, or "favorited," fueling stations. A user may commonly frequent one or more fueling stations and the app or user can save these fueling stations as a frequently visited or "favorite" fueling station. The user can then access or be presented this list to allow the user to more efficiently select a fueling station for which they will provide feedback regarding their fueling experience.

In the main portion 310, the user can input data and/or information regarding a fueling event, including the date 311, time 312, station 313, station status 314, fuel price 315, payment problems 316, fueling problems 317, a fuel amount 318, a fueling cost 319 and other issues 320. Once the user has finished entering the relevant information regarding the fueling event, the user can select the submit 321 button to log and/or transmit the fueling event and information related thereto.

The date 311 and time 312 can be populated, such as by using the internal clock associated with the user device on which the user app is operating. Alternatively, the user can manually enter the date 311 and time 312 of the fueling event using a drop down menu of options, manual entry and/or other data entry methods or means. The ability of the user to manually enter the date 311 and time 312 of the fueling event can be limited by the user app, a user app administration system and/or other control system, to prevent the manual entry of the date 311 and time 312 of the fueling event, and/or restrict the manual entry to a selected, or predetermined, window of time, such as based on the internal clock associated with the user device. That is, a user can be prevented from manually entering and/or adjusting the date 311 and time 312 of the fueling event, and/or can be provided a selected, or predetermined, amount of time after a fueling event occurrence in which to provide input regarding the fueling event, such as a date 311 and time 312.

The fueling station 313 at which the fueling event occurred can be inputted by the user by selecting the fueling station 313 from a pre-populated list of fueling stations, manually entering the fueling station, by searching a database of fueling stations and selecting the fueling station 313 and/or other methods or systems of inputting the fueling station 313. If the user inputted fueling station 313 is not known to the user app and/or the fueling station network management system, one or both of the user app and the fueling station network management system can add the user inputted fueling station as a new fueling station and begin to log fueling events occurring there. The added fueling station can require approval, such as by a user app administrator or the fueling station network management administrator, before the new fueling station is added to the user app and available to other users.

The station status 314 can be selected from a list of presented options and/or by a simple "yes" or "no" input for the user to indicate whether the fueling station is able to dispense fuel. Other fueling station statuses, such as online, closed, etc., can be provided through the user app interface 300 for the user to select from. For example, the user can be prompted to select from a list of prepopulated fueling station statuses 314, that include online, closed or technician. The online status can indicate the fueling station and/or fueling point is able to dispense fuel. The closed status can indicate the fueling station and/or fueling point is closed and/or currently unable to dispense fuel. The technician status can indicate that maintenance, repair or other service is being performed at the fueling station and/or fueling point and that the ability to dispense fuel may be limited depending on the work being performed. Additionally, the fueling station status 314 can be pre-populated with user selections options based on the user selected fueling station 313.

The fuel price 315 can be prepopulated using fuel price 315 data previously logged by the user or other users of the user app, selected by the user using a drop down menu, manually entered, another method and/or a combination thereof. For example, the fuel price 315 can be prepopulated using the fuel price data from the last user app, or fuel station network management system, logged fueling event for the particular fueling station. Alternatively, such as if the fuel price data is not otherwise available, the fuel price 315 can be presented as a drop down menu from which the user makes a selection or the user can manually enter an amount and a drop down menu can be provided to allow the user to select a unit and/or type of fuel the manually entered amount is for.

The payment problem 316 input can allow the user to indicate that they experienced issues related to the payment process during the fueling event that is being logged using the user app interface 300. In the example presented, the user can indicate whether they experienced such issues by selecting "yes" or "no." Alternatively, other selectable options and/or a manual user input can be provided to allow the user to input information regarding payment problems 316, or lack thereof, experienced by the user during a fueling event. If the user indicates there were payment problems 316 then the user app interface 300 may present a list of common payment problems 316 for the user to select from. If the user's specific payment problem is not presented, the user can be provided the opportunity to supply a custom response, such as by text entry, to indicate the nature of their payment problem 316.

Similar to the payment problem 316 input, the fueling problem 317 input may first prompt a user to indicate if they experienced a problem or issues with the act of fueling during the fueling event. An example fueling problem 317 can include the user receiving only a partial fill during the fueling event, i.e. the user requested a complete fill and receives only a partial fill due to an error and/or malfunction with the fueling station and/or its equipment. If the user indicates such an issue occurred, the user app interface 300 can provide a pre-populated list of fueling problems 317 for the user to select from. As with the payment problem 316 input, if the user's fueling problem 317 is not listed, the user can input a custom entry related to the issue they experienced during the act of fueling. Additionally, with both the payment problem 316 and the fueling problem 317, the user can be allowed to enter multiple issues with either or both for the fueling event being logged through the user app interface 300.

The fuel amount 318 can be inputted by the user, similar to the fuel price 315, selecting from a prepopulated list of options, using a drop down menu, manually entered, another method and/or a combination thereof. The unit of fuel indicated by the user's entry of the fuel price 315 can be populated to the fuel amount input 318, such as a user selection of price per gallon for the fuel price 315 can cause gallons to be populated in the fuel amount 318 input. Alternatively, the user can be presented or allowed to input the fuel units associated with the fuel amount 318 dispensed during the fueling event. In other embodiments, the user vehicle and user app can communicate allowing the user vehicle to transmit a fuel amount 318 to the user app.

Fueling cost 319 can be the total cost of the dispensed fuel and can include taxes and/or other associated costs. The user can manually or otherwise input the fueling cost 319. Alternatively, or additionally, the user app, a backend data server or the user, can modify the fueling cost to remove taxes and/or other associated costs to represent a true cost of the fuel dispensed during the fueling event. In other embodiments, the user app and/or user device can communicate with the fueling station, or other, payment systems to receive the fueling cost 319.

Other issues 320 can allow a user to input or provide information regarding any other issues they experienced during the fueling event. For example, the user can indicate whether such issues occurred by selecting "yes" or "no" in the provided input 320. Alternatively, other selectable options and/or a manual user input can be provided to allow the user to input information regarding other issues 320. An indication that other issues 320 occurred can prompt the user to select or input the issue they experienced during the fueling event.

Once the user has completed entering information regarding the fueling event, they can select the submit button 321 to transmit the logged fueling event to a data server, store the logged event on the user device, or otherwise communicate and/or store the logged fueling event. User selection of the submit button 321 can cause the app to validate or otherwise check the user provided inputs to determine if revisions and/or further information is required or desired regarding the fueling event.

To navigate through the user app, the user can use the icons 350, 360, 370 and 380, to select and navigate to desired portions of the user app. The fueling event icon 350 can take the user to the example screen shown in FIG. 3 to allow the user to input information regarding a fueling event. Selection of other icons can display different screens and/or interfaces for user interaction. Such screens can be separate from or displayed over the preceding or other screen of the user app.

User selection of the history icon 360 can take a user to a screen/interface where the user can view their past logged fueling events. Optionally, the user app can include editing functionality to allow a user to edit a past logged fueling event to add, correct and/or revise the user supplied information regarding the logged fueling event. In an embodiment, the ability to correct and/or revise a past logged fueling event can be restricted, such as by the user app, user app administration system and/or other management. While the ability to correct/revise a past logged fueling event, the ability to add additional information, such as an odometer value, can be permitted. Additionally, the history screen/interface can allow the user to access recent fueling events logged by other users of the user app, specific fueling station logged fueling events and other historical information regarding fueling events logged by the user and/or other users using the user app. To display the historical information, the user app can communicate with a data server to receive the other logged fueling events.

A user can also access information regarding a particular fueling station's historical use through the history icon 360 and/or other user screen/interface of the user app. The fueling station's historical use can provide a user information regarding the average customer attendance at the fueling station during different time periods. For example, the fueling station's historical use can be presented graphically as a bar graph having times during the day along the horizontal axis and the vertical access associated with customer attendance. For each time period a bar will extend vertically to indicate the customer attendance typical of that time period. Using such a chart, a user can determine whether a particular fueling station will be busy at the time of their attendance and can decide to attend the station based during a less busy time, if so desired. Fueling stations have a limited number of fueling points for vehicles to be connected to receive fuel and during the busier times, a user may have to wait for a period of time for an available fueling point. Using the fueling station's historical use data, the user can select a less busy time to attend the fueling station to, hopefully, avoid having to wait for an available fueling point to connect their vehicle to.

The help icon 370 can be selected by the user to display assistive information. This can include "how-to's," "FAQs," "contact information" and other helpful information. Such information can be related to the user app, the fueling station, the vehicle, other information and/or combinations thereof. For example, the help screen/interface can provide the user instructions on how to properly fuel their vehicle or provide contact information for the fueling station to allow the user to report an issue directly. Additional contact information, such as for the vehicle manufacturer, fueling station service and equipment providers and/or other related business, systems and/or personnel can be accessible through the user app as required or desired. In an embodiment, contact with the relevant or desired party can be initiated through the contact information displayed. For example, a user can select a phone number for the fueling station service provider to initiate a call to the fueling station provider through the user device, such as a cell phone.

The user icon 380 can be selected to allow the user to access information regarding the user and/or the user app. Such information can include a user profile, stored fuel stations the user frequents, a user fueling history and their user app preferences. The user profile can contain identifying information regarding the user, such as their name, their vehicle (make, model, and/or vehicle identification number), their user app login credentials and/or a user avatar. Stored fuel stations can be selected by the user as fuel stations they frequently visited, this information can be populated to other portions of the user app to populate selection menus/options. User app preferences can be modified by the user to customize aspects of the user app, such as the display of the user app on the user device.

Figure 4:
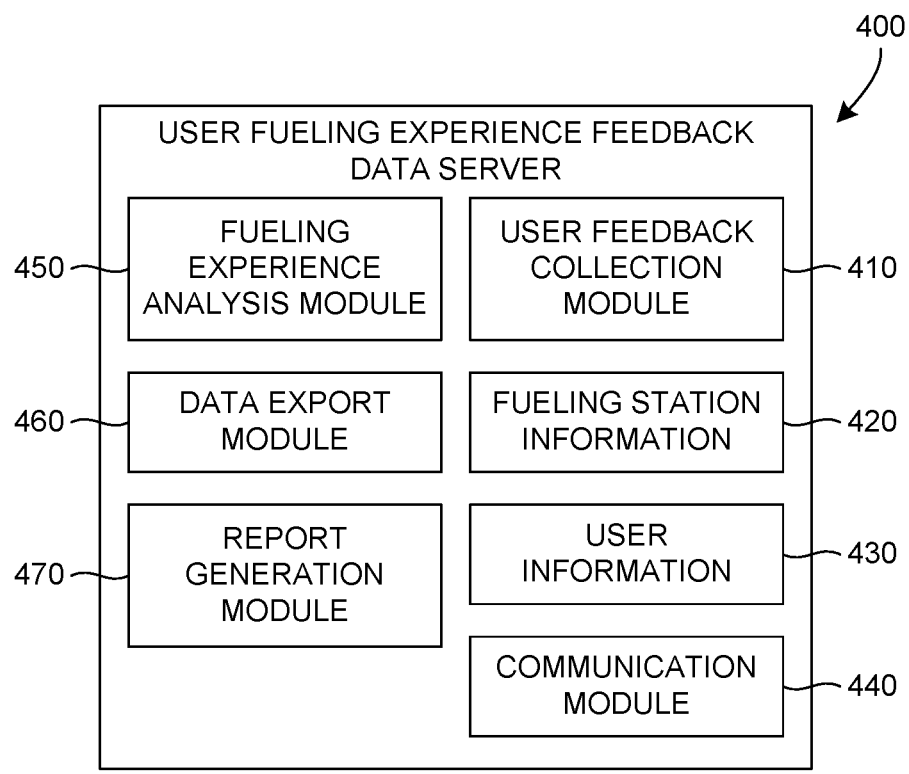
FIG. 4 is a block diagram of an example user fueling experience feedback data server.

FIG. 4 is a block diagram of an example user fueling experience feedback data server 400. The data server 400 can communicate with the user app on a user device to collect information regarding a user's fueling experience and can perform analysis and/or evaluation of the collected data. The data server 400 can include various databases and/or modules for use in storing, receiving and/or processing the collected user fueling event data. While the data server 400 is described as a single entity, the data server 400 can be distributed system.

A user feedback collection module 410 can collect and store information for the logged fueling events of the users of the user app. The logged fueling events can be stored with identifying user information, stored anonymously or partially anonymized, such as with an identifier to allow the association of the logged event with one or more properties of the logged event (vehicle type, user characteristic, etc.). The information collected from the user app for a fuel event can be stored by the user feedback collection module 410 using one or more data storage and/or database formats, techniques and/or methods.

Fueling station information 420 can be stored by the data server 400. Such information can include the identity of fueling stations and other information regarding the particular fueling station, such as a location and/or status. The logged fueling event, stored in the user feedback collection module 410, can include a fueling station identifier associated with a fueling station having information stored in the fueling station information 420. This fueling station identifier can be used to correlate the logged fueling event with a particular fueling station.

User information 430 can include identifying user information, such as a username, actual name, user app login credentials for verification of the user, a user's vehicle, a user's vehicle VIN (vehicle identification number) and/or other user information. Each user having information stored in the user information 430 of the data server 400 can have an identifier assigned to allow the correlation of a logged fueling event stored by the user feedback collection module with a particular user. Additionally, the user information 430 can be stored in a secured or encrypted format so as to protect the user information. Prior to interacting with the user app, the user can be informed of a privacy policy and/or prompted to accept terms and conditions for using the user app, a user's acceptance and/or acknowledgement can be stored with user information 430.

A communication module 440 of the data server 400 can facilitate communication between the modules of the data server 400, external devices and/or external systems, such as a user app on a user device. A variety of communication protocols can be employed by the communication module 440 to provide the required and/or desired communications between the data server 400 and other systems/devices.

A fueling experience analysis module 450 of the data server 400 can analyze the collected information regarding logged fueling events. Such analysis can include trend analysis, rating/ranking of fuel stations and/or other desired analyses. These analyses can assist users, fueling stations, vehicle manufacturers and/or other interested parties in improving the user fueling experience and/or fueling station reliability. The user fueling experience can cause users to select one fueling station over another and can have an influence on the adoption of a vehicle, having a particular fuel type, and/or fueling technologies due to user experiences associated with fueling the vehicle and/or the fuel type.

A data export module 460 of the data server 400 can compile and/or export data from the data server 400 to other users and/or external systems. The data export module 460 can prepare data for export in response to a request for the data. The preparation of the data can include anonymizing the data, limiting the data based on the request, formatting the data and/or other data preparation as necessary or desired. Once prepared by the data export module 460, the prepared data can be transmitted by the communication module 440. Alternatively, the data export module 460 can transmit or otherwise export the data itself.

A report generation module 470 can prepare reports based on the analyzed and/or collected data of the data server 400. The report generation module 470 can include tools or interfaces to allow custom or pre-designed reports to be prepared. The reports generated by the report generation module 470 can present the collected and/or analyzed data in a desired format, such as in a visual chart.

Figure 5:
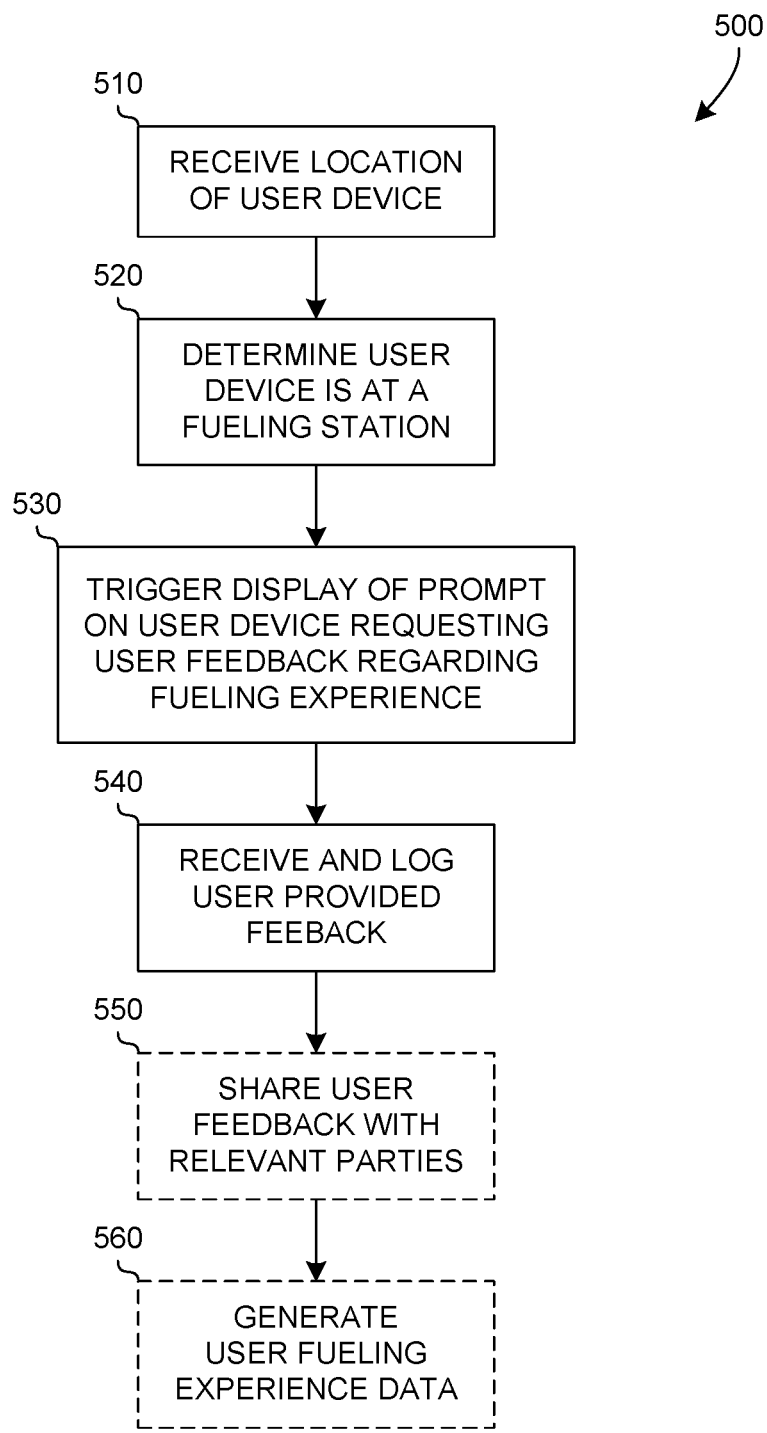
FIG. 5 is a flow diagram of an example fueling event data collection process.

FIG. 5 illustrates an example user fueling event data collection method 500. In this method 500, the user is prompted to provide information regarding a fueling event based on the location of the user device. The use of a user's location information can be enabled or disabled as a user preference associated with the user app.

At 510, a fueling station network management system can receive a location of a user device. The location of the user device can be regularly broadcasted to the fueling station network management system or a geolocation module of the user device can trigger the broadcast of the user device location to the fueling station network management system based on a predetermined, or user defined, threshold, such as a distance of a user device from a known location of a fueling station. Optionally, a user can select various user preferences, such as a fuel type, to limit or filter the fueling station results based on the location of the user device. Other or alternative methods of transmitting the location of a user device to the fueling station network management system can be implemented.

At 520, the fueling station network management system determines that, based on the received location of the user device, that the user device is at a fueling station. Based on the determined location of the user device, the fueling station network management system, at 530, can trigger a prompt to be displayed on the user device, requesting the user provide feedback regarding the fueling experience. The user can then select the prompt or otherwise interact with a user app on the user device to provide the requested feedback. Alternatively, the user can ignore the prompt and/or decline to provide the requested feedback.

At 540, the fueling station network management system receives and logs the user provided feedback, such as storing the provided feedback at a data server. The fueling station network management system can then, optionally, share the user feedback with relevant parties 550, such as a fueling station, fueling station operator, vehicle manufacturer, other users and/or other parties. The sharing of data from the fueling station network management system can be done using one or more communication systems and/or methods, including sharing such data through the user app itself. Additionally, the fueling station network management system can, optionally, generate user fueling experience data 560 based on the user provided feedback. The user fueling experience data can include analysis of multiple users' provided feedback data to provide insight into user fueling experiences.

Figure 6:
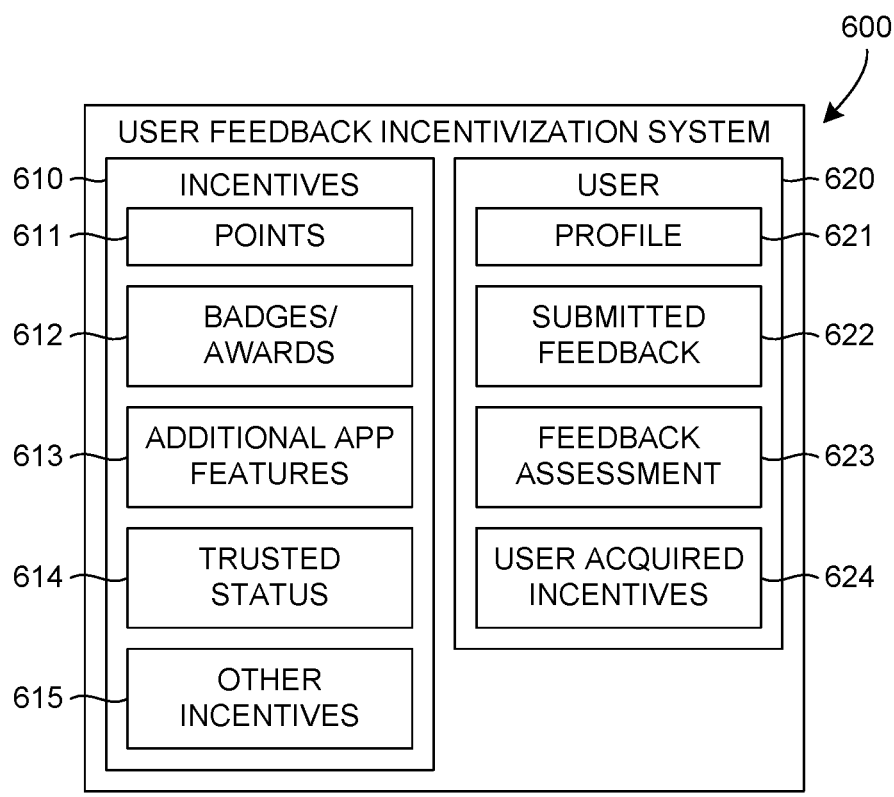
FIG. 6 is an example user feedback incentivization system.

FIG. 6 is an example user feedback incentivization system 600. The user feedback incentivization system 600 can provide incentives 610 to users 620 for their participation in providing feedback regarding a fueling event. Example incentives 610 can include points 611, badges/awards 612, additional app features 613, trusted status 614 and/or other incentives 615. The incentivization can encourage user 620 participation in the feedback program which can increase the data collection to provide more data for analysis and evaluation.

Points 611 can be awarded to a user 620 as an indicator of their participation in providing feedback regarding fueling events. The points 611 can provide a ranking of the user's activity/participation and can, optionally, be used to provide rewards based on that participation.

Badges/awards 612 can be visual rewards indicative of the user's participation. The badges/awards 612 can be public, visible to other users, or private to the user who earned the incentive. The desire to collect the badges/awards 612 can encourage a user's participation in providing the feedback as they can be indicative of the user's accomplishments and used for competition with other users.

Additional app features 613 can be a user incentive 610 for participation for providing fuel event, or fueling experience, feedback/information. The additional app features 612 can include additional functionality or features that are otherwise inaccessible or unusable by a user 620. For example, an additional app feature 613 could be the removal of ads or additional customization options for the user app.

Trusted status 614 can be an incentive that is awarded to users 620 who have demonstrated they can provide good feedback, or information, regarding fueling events. For example, in order to prevent manipulation of the collected data by providing false or incorrect data, the fueling station network management system may discount or slow the adoption of information provided by untrusted users. Once users have demonstrated their ability to provide accurate feedback, the trusted status 614 incentive can allow their provided feedback to be accepted as inputted. The trusted status 614 can also provide the user 620 with other incentives, such as badges/awards 612 and/or additional app features 613.

Other incentives 615 can be determined by the fueling station network management system managers or administrators. As with all the incentives 610, the system administration can determine which incentives 610 to offer and the user criteria to earn those incentives 610.

The user 620 can have a profile 621, submitted feedback 622, a feedback assessment 623 and user acquired incentives 624. The profile 621 can include information about the user 620, such as a user name, identity, etc. The submitted feedback 622 can include the feedback and information the user has submitted through the fueling station network management system regarding their various fueling events. The feedback assessment 623 can be an evaluation or indication of the validity and/or quality of the user's submitted feedback 622. The user 620 can be associated with a feedback assessment 623 but may not be able to actually view the assessment 623. The user acquired incentives 624 can be a record of the incentives 610 associated with the particular user 620. The user acquired incentives 624 can, optionally, effect a user's 610 interaction with the fueling station network management system, such as through a user app.

The above described fueling station network management systems and elements can also include integration or communication with a user's vehicle. The user's vehicle has on-board vehicle management systems that can also provide information to the fueling station management network system, such as through communication with the user app on a user device. Such integration can allow the user app to provide relevant and timely information to the user, such as fueling station recommendations based on the information and data collected by the fueling station management network system. This additional information can also assist in providing information regarding a user's vehicle use habits which can assist with improving the fueling station management network system and a user's fueling experience.

FIGS. 7A-7D illustrate example screenshots of a user application, such as a user can use to provide information/feedback regarding a fueling station and/or receive information, such as rating, rankings and/or other information, regarding the fueling station. The user application can be installed on a computing device, such as a cellphone or tablet, and/or can be accessible through other electronic interfaces, such as a kiosk or computer, to allow a user to provide and receive information regarding a fueling station and/or fueling experience.

Figure 7A:
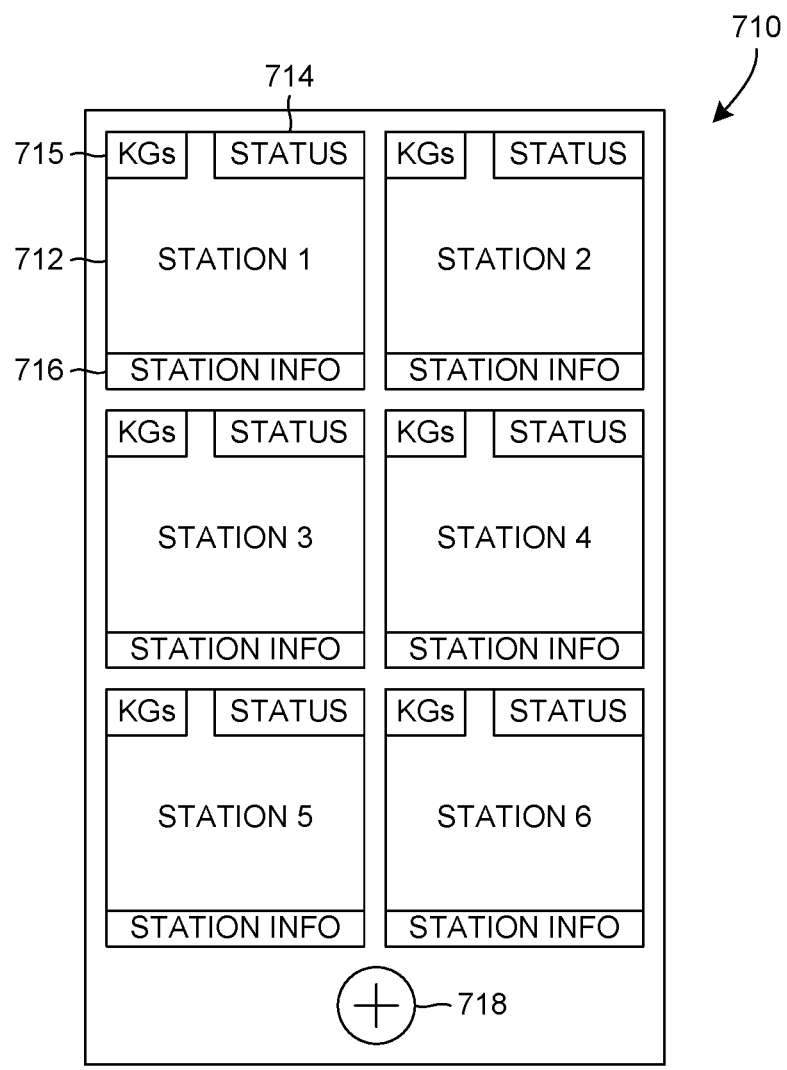

FIG. 7A is an example station overview screen 710. One or more fueling stations 712, their status 714, an amount of fuel remaining at the fueling station 715, and/or information 716, can be displayed on the overview screen 710. The fueling stations 712 populated on the overview screen 710 can be fueling stations 712 for which the user has submitted a survey/feedback, or otherwise favorited, and/or added, by a user, such as fueling stations 712 they commonly use. Alternatively, or additionally, the fueling stations 712 can be included on the overview screen 710 based on their ratings, status information, and/or their proximity to a current location of the user, such as can be provided by a mobile computing device.

The user can select the icon 718 to start a survey/feedback process to submit information regarding a fueling station 712 and/or their fueling experience. After selecting the icon 718, the user can be prompted to provide information regarding the fueling station 712 they would like to submit the survey/feedback for and/or be provided a list from which to select a fueling station 712 to submit the survey/feedback for. The list of fueling stations 712, from which the user is prompted to select, can include user filtering options to reduce the number of fueling stations 712 listed from which to select from. Additionally, the user can be provided an option to view the list of fueling stations 712 in a map view, with the location of each of the fueling stations 712 indicated on a map. The user can then select the fueling station 712 they wish to add based on the location of the fueling station 712. Once the user has selected a fueling station 712, the app can navigate the user through one or more screens/inputs to assist with collection of the user's responses/feedback regarding the fueling station 712 and/or their fueling experience.

The status 714 of the fueling station 712 can be an indication of the online status of the fueling station 712, such as whether the fueling station is open or closed for business, whether the fueling station 712 is disconnected from the fueling station network and/or other status information regarding the fueling station 712. The status 714 information can be an observed status, such a based on user submitted information that can be received through surveys/feedback, and/or the status provided by the fueling station 712 itself, such as through the Station Operational Status System (SOSS) and/or other 3rd party network. The observed user status can include various indications, such as a good status, a Tech on Site status, an issue with the point-of-sale (POS) and/or an unavailable status. A user can optionally select a preferred status type, such as the observed or SOSS status, to be displayed for each fueling station 712 in the overview screen 710. Fueling stations 712 can be located outside of an area not covered by and/or can be not connected to the SOSS or other 3rd party system and so will not be able to self-report a status. For such fueling stations, no status 714 may be displayed and/or, such as by default, an observed status can be displayed.

The station information 716 can include an overview, or selected, information regarding the fueling station 712. For example, the station information 716 can include a price of fuel at the fueling station, the amount of fuel that was dispensed by fueling station at the last survey/feedback submission and/or other station information 716. The display station information 716 can be preselected information and/or can be user selected information regarding the fueling stations 712. That is, the station information 716 can be preselected categories/elements of information or a user can be permitted to edit the categories/elements of information that are presented in the station information 716 of the overview screen 710. In an example in which the station information 716 displayed includes information regarding the fuel dispensed at the last survey/feedback submissions, the information can be displayed as an amount of fuel dispensed, such as in kilograms, or a price of the fuel dispensed, such as $/kg.

The station 712 can be represented as an icon that can include colors, and/or other features/characteristics, that are selected based on a status 714 of the station and/or the station info 716. For example, an online, or active, fueling station 712 can be displayed with a green background, or overlay, to provide a visual indication of the status of the fueling station 712. Similarly, an offline, or inactive, fueling station 712 can be displayed with a red background/overlay to provide a status indication. For fueling stations 712 with reduced, or lower, amounts of fuel remaining, the icon be displayed with a yellow, or cautionary, background/overlay to provide a status indication.

To access additional information regarding the fueling station 712, such as rating/ranking information, a user can select a fueling station 712 icon. Once selected, the user can be presented a screen populated with various information regarding the fueling station 712, such as hours of operation, the fuel type(s) provided, accepted payment methods, rating/ranking data, and/or other information regarding the selected fueling station 712.

Figure 7B:
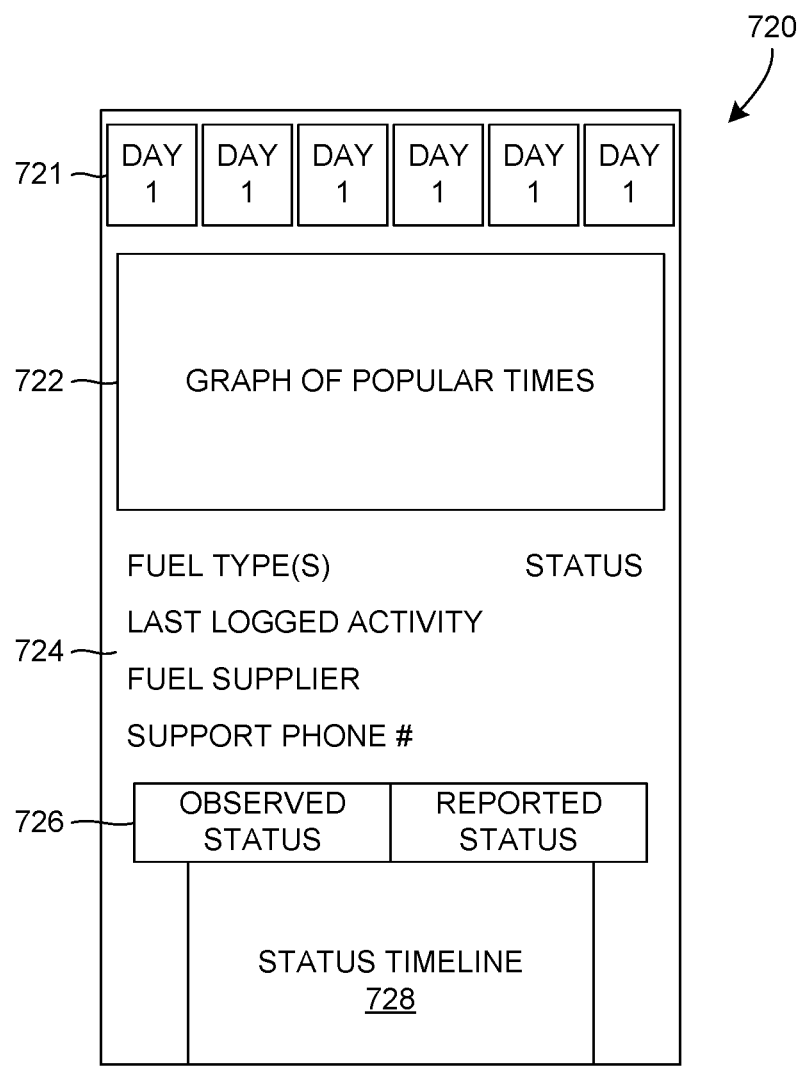

FIG. 7B is an example fueling station details screen 720. The fueling station details screen 720 can include various operational/historical information regarding the fueling station and its status. A user can select a particular day/date 721 of fueling station status information to be displayed. Use of the fueling station can be tracked and used to generate the graph of popular times 722, which provides a visual correlation of the station's use with hours of the selected day/date. The user can optionally use the graph 722 to select a particular time to visit the fueling station based on the popularity of the fueling station at the particular time.

Fueling station details 724 can also be displayed on the details screen 720. The fueling station details 724 can include the fuel type(s) provided at the station and a status of the station and/or fuel type(s). The last logged activity at the station can also be displayed, which can provide an indication of how popular the station is and/or the potential accuracy of the information displayed. For example, the information displayed may be more accurate, pertinent and/or relevant if the last logged activity is more recent rather than later. Additionally, the fuel supplier/source can be provided along with contact information for support with the fueling station, such as a station operator or vehicle manufacturer. In this manner, the user can be provided contact information for relevant parties should they experience fueling issues while at the station and/or have questions regarding the fueling process.

A status timeline 728 can also be displayed and can include historical information regarding the status of the fueling station associated with times. A user can select between various statuses 726, such as observed status and reported status. Observed status of the fueling station can be based on user provided information regarding the status of the fueling station, such as the station being online or offline, which are correlated to a day/time for display in the status timeline 728. Reported status of the fueling station can include the status of the fueling station as reported by the fueling station to the fueling station network, such as through the SOSS and/or other 3rd party network. The reported status can include an associated day/time for display in the status timeline 728. A user can switch between the observed and reported statuses to assess the validity of the indicated status of the fueling station. For example, a fueling station reporting an online status regularly, while simultaneously having an observed status of offline, can be an indication that the reported status of the fueling station may not be trustworthy. The user can assess the various information provided, such as the status timeline 728, to assist with selecting a fueling station for use.

FIG. 7C is an example fueling summary screen 730 through which a user can provide details regarding their fueling event/experience. The user can input, or provide, the cost of the fuel, such as in dollars ($) per kilogram (kg), the amount of fuel they received, such as in kilograms (kg) and a total cost for the fueling, such as in dollars ($). Alternatively, some, or all, of the user input information can be supplied to the app by the fueling station itself and/or retrieved/request by the app from the fueling station. For example, the fueling station can provide the price of the fuel along with the amount of fuel dispensed and total cost, upon completion of the fueling event. The data can be automatically transmitted to the app by the fueling station and/or the app can query the fueling station to receive such To input/provide other data, the user can select various categories, such as status, card, fill, receipt, and/or nozzle, to be presented an input screen through which the user can provide information regarding the selected category.

The user can select the status icon to provide information regarding the status of the fueling station. Upon selection of the status icon, the user can be presented a screen to input observed status of the fueling station. The screen can include selectable icons that the user can select to indicate the fueling station. Example icons/statuses can include a good status, a tech on site status, a point of sale (POS) issue status and/or an unavailable status. The good status can be selected to indicate that the station as active at the time of the fueling event. The tech on site status can be selected to indicate that maintenance work was being performed at the time of the fueling event and can provide an indication that the station may be required to go offline and/or may experience delays due to issues for which the tech is attempting to correct. The POS issue status can be selected to indicate that the user experienced difficulties paying for the fuel. The unavailable status can be selected to indicate that the fueling station was unavailable, such as offline, at the time of the attempted fueling event. Additionally, the user can also be provided an opportunity to input notes, such as additional information, regarding the fueling station status. The selected status information provided by the user can be populated to the status timeline 728 of FIG. 7B to provide other users information regarding the status of the fueling station. Additionally, the status information can be provided to an operator of the fueling station so that corrective action may be taken to rectify/correct issues with the status of the fueling station.

The user can select the card icon to provide information regarding their payment experience at the fueling station. Upon selection of the card icon, the user can be presented a screen of selectable icons to input information regarding the payment at the fueling station. Example selectable icons can include a good experience indication, an indication that multiple swipes of one or more payment cards was required, an indication that no payment was required and/or an indication for other, user provided, fueling experience feedback. The good indication can be selected to indicate that no payment issues were experienced by the user during the fueling experience. The multiple swipes indication can be selected if the user was required to swipe/provide their payment card(s) multiple times to complete the payment process. The free fuel indication can be selected if the user was provided fuel without a payment, either accidentally or intentionally. The other indication can be selected if the user experiences a fueling issue that is not listed. Additionally, the user can be provided an opportunity to provide notes or additional information regarding the payment experience. Further, similar to the status, the user provided payment feedback can be provided to other user and/or an operator of the fueling station.

The user can select the fill icon to provide information regarding the amount of fuel they received. Upon selection of the fill icon, the user can be presented a screen of selectable icons and inputs to provide information regarding the amount of fuel received. Example selectable icons can include a full fill, a partial fill, an unable to fill indication and/or an other indication. The user can select one of the indications based on the amount of fuel received. For example, if the user received a full or partial fill they can select the appropriate icon. In the case of a partial fill, the user can also provide an indication that the partial fill was desired or if a full fill had been requested but was unable to be completed. The unable to fill indication can be selected if the user was unable to receive any fuel and/or received an incorrect amount of fuel. The other indication can be selected if the user desires to provide an indication other than the provided indications. Additionally, the user can be provided an opportunity to provide notes or additional information regarding the amount of fuel received. The user can also be presented inputs through which the user can indicate the amount of fuel they received and the price of the fuel. Again, the user provided information can be provided to other users and/or an operator of the fueling station.

The user can select the receipt icon to provide information regarding the receipt they receive after receiving fuel. In this context, the receipt can be a physical receipt that the user receives, or expects to receive, upon completion of the fueling event, or the receipt can be a digital or electronic receipt that is provided, or communicated, to the user, such as through email. Upon selection of the receipt icon, the user can be presented a screen of selectable icons to provide information regarding the receipt received. Example selectable icons can include a good indication, a no receipt indication, an indication that the receipt was incorrect and/or an indication that it was a $0 receipt. The user can select one of the indications based on the receipt they received and/or their receipt experience. The user can select the good indication to indicate that they received a receipt without, or with minimal, issue(s). If no receipt was received, the user can select the no receipt indication, which can indicate to users and/or the fueling station operator that there is an issue with the receipt mechanism/system. If the user receives a receipt with incorrect information, the user can select the indication that the receipt was incorrect. Example incorrect receipts can include receipts that have fuel unit pricing different than what is indicated or displayed at the fueling station. A user can select the $0 receipt indication if they receive a receipt for a transaction of $0.00. The $0.00 transaction can occur when the fueling pump, either accidentally or intentionally, resets, which causes the filling cycle to complete without any fuel being dispensed. Such an occurrence can be caused by various reasons, such as a loss of connectivity, loss of pressure and/or other reasons that cause the fueling pump to reset and results in fuel not being dispensed. Additionally, the user can be provided an opportunity to provide notes or additional information regarding the amount of fuel received.

The user can select the nozzle icon to provide information regarding the fuel dispensing nozzle and their experience using it. Upon selection of the nozzle icon, the user can be presented a screen of selectable icons to provide information regarding the nozzle and/or its operation. Example selectable icons can include a good indication, an indication that the nozzle was frozen, an indication that the user experienced sticking while using the nozzle and/or an indication of the other issues and/or experiences regarding the nozzle. The user can select the good indication to indicate that they did not experience nozzle-related issues, or problems, during their fueling experience. When dispensing hydrogen fuel, the nozzle, or portions thereof, can be coated in an ice coating due to the low temperature of the hydrogen gas being dispensed, which cools the nozzle, and the moisture in the surrounding air. The moisture can condense and freeze onto the cooled nozzle, which can make operation of the nozzle difficult and/or impede the dispensing of fuel from the nozzle. If the user experiences, or encounters, such freezing, the user can select the frozen nozzle indication. If the user experiences issues with the nozzle sticking, such as difficulties engaging and/or disengaging the nozzle from the fueling receptacle of the vehicle, the user can select the sticking indication. The other indication can be selected if the user desires to provide an indication other than the provided indications. Additionally, the user can be provided an opportunity to provide notes or additional information regarding the amount of fuel received.

The user can also provide a rating of the fueling station, and/or their fueling experience, through the fueling summary screen 730. The user can select a rating, such as a number of stars and/or portions thereof, based on their experience at/with the fueling station. The user provided rating can be collected and transmitted through the fueling station network for use in rating and/or ranking the particular fueling station. In an example, the collective ratings of the station can be collected and/or weighted to generate an over rating for the station. Additionally, individual user ratings of the fueling station can be visible/accessible by other users, such as through the fueling station details screen.

Trip and odometer mileage can also be provided by the user through the fueling summary screen. Inputs can be provided to allow the user to input mileage values for the trip, such as the mileage traveled between fueling events, and mileage values for the vehicle odometer. The provided mileage information can be collected for the user's records and/or transmitted/provided to other parties, such as vehicle manufacturers, to track and/or assess vehicle performance.

Once the user has completed, or input, information into the fueling summary screen 730, the user can select the save icon to log the fueling event. The logged fueling event can be stored in the fueling station network and the various data provided can be used to assess, rate and/or rank the fueling station. Additionally, user experienced issues encountered during the fueling experience can be optionally provided to the fueling station operator, and/or other parties, to assist with correcting the user experienced issues.

Figure 7D:
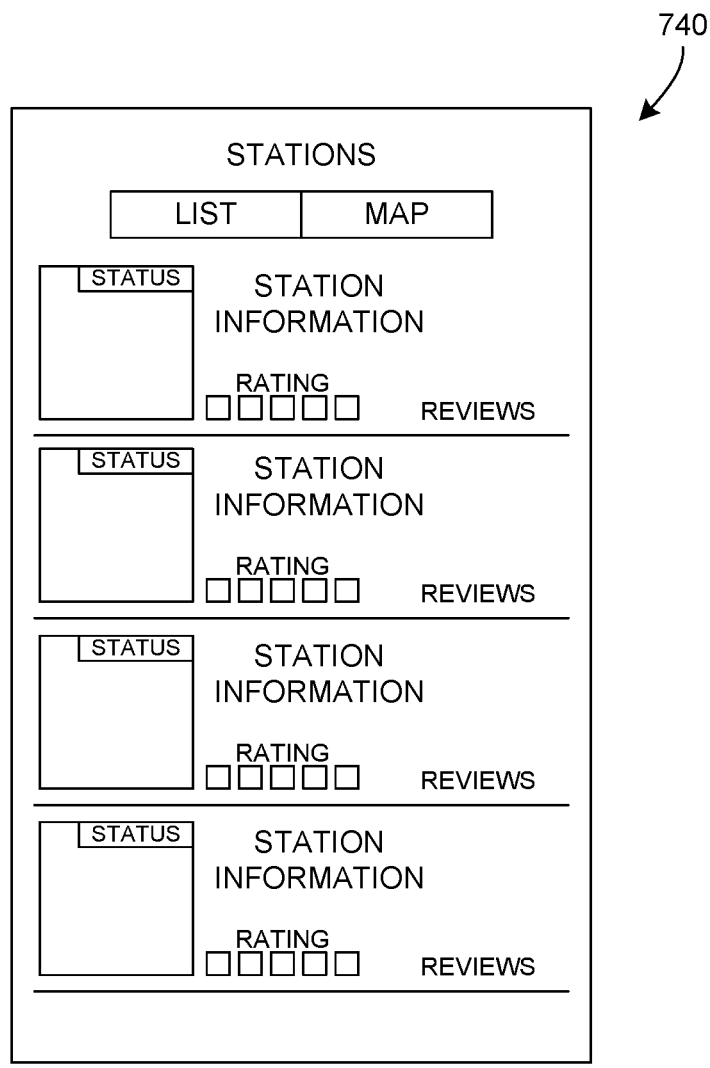

FIG. 7D illustrates an example suggested fueling station screen 740. The suggested fueling station screen 740 includes a listing of one or more fueling stations that can be selected based on the user's proximity to the fueling stations, the rating/ranking information of the fueling stations, the status of the fueling stations and/or other fueling station/user experience information. Various information regarding each of the displayed fueling stations, such as the status, information, ratings and/or reviews, can be provided on the screen 740. The user can optionally use the provided fueling station information to assist with selecting a fueling station. The suggested fueling stations can be presented as a list, as shown in FIG. 7D, or can be displayed in a map view that indicates the position of the fueling stations on a map. The fueling stations, listed or on the map, can be, optionally, user selectable to allow the user to receive further information regarding the station, such as the fueling station details screen 720 of FIG. 7B.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A fueling station management system, comprising:
 a fueling station, including:
  a location of the fueling station, and
  a fuel dispensing system configured to interface with a vehicle to dispense fuel;
 a user device, including:
  a geolocation module configured to determine a location of the user device, and
  an application configured to:
   transmit the location of the user device to a data server,
   transmit a request for a fueling station recommendation to the data server, the request initiated by a user of the user device,
   display a prompt on the user device to the user of the user device, the prompt configured to request user feedback data regarding the fueling station,
   receive the user feedback data regarding the fueling station, and
   transmit the user feedback data to the data server;
 the data server configured to:
  receive the request for the fueling station recommendation, the user feedback data, and the location of the user device,
  compare the location of the fueling station and the location of the user device,
  trigger the application to display the prompt on the user device when the user device and the fueling station are within a predetermined threshold distance of each other,
  store the received user feedback data,
  store fueling station data associated with the fueling station, the fueling station data including the location of the fueling station,
  generate ratings data for the fueling station from the received user feedback data and the fueling station data, and
  provide, to the application for display on the user device, in response to the request for the fueling station recommendation, a suggested fueling station based on the generated ratings data.

2. The fueling station management system of claim 1, wherein the fueling station further includes a payment system configured to receive payment based on the dispensed hydrogen gas, the fueling station providing payment system data to the fueling station database of the data server.

3. The fueling station management system of claim 2, wherein the rating metrics further includes the payment system data.

4. The fueling station management system of claim 1, wherein the fueling station further includes a status of the fueling station, the fueling station providing the status to the data fueling station database of the data server.

5. The fueling station management system of claim 4, wherein the rating metrics further includes the status of the fueling station.

6. The fueling station management system of claim 1, wherein the application is further configured to suggest a fueling station based on the location of the user device and the location of the fueling station.

7. The fueling station management system of claim 6, wherein the application causes the user device to display the prompt to receive the user feedback data.

8. The fueling station management system of claim 1, Wherein the suggested fueling station is further based on the user-provided status of the fueling station.

9. The fueling station management system of claim 1, wherein the user feedback data includes an indication of a fueling issue experienced during fueling of the vehicle, including at least one of a payment issue or a fuel dispensing issue.

10. The fueling station management system of claim 1, wherein the data server is configured to provide a listing of one or more suggested fueling stations, a location of each of the one or more suggested fueling stations and a status of each of the one or more fueling station to the user device in response to the query by the user device.

11. The fueling station management system of claim 10, wherein the listing of the one or more suggested fueling stations is based at least in part on a location of the user device, the location of the user device received by the data server from the user device.

12. The fueling station management system of claim 1, wherein the user feedback data further includes at least one of a user review of the fueling station or a user rating of the fueling station.

13. The fueling station management system of claim 1, wherein the data server further includes an incentivization system to incentivize the input of user feedback data, the incentivization system configured to allocate one or more incentives to a user profile based on user feedback data associated with the user profile.

14. The fueling station management system of claim 13, wherein the incentives include one or more of user points, user badges, additional functionality of the application and a trusted user status.

15. The fueling station management system of claim 13, wherein the data server further includes a user database for storing user data including the user profile, the user data including correlation of user feedback data associated with the user profile, the user database further storing incentives associated with the user profile.

16. The fueling station management system of claim 15, wherein the user data further includes an assessment of the user feedback data associate with the user profile, the assessment performed by the data server based on user feedback data associated with one or more other user profiles.

17. The fueling station management system of claim 1, wherein the data server further includes a fueling experience analysis module that performs one or more of a statistical analysis or a trend analysis on the user feedback data and the fueling station data to generate the rating metrics.

18. The fueling station management system of claim 17, wherein the data server further includes a report generation module configured to generate a report that includes a correlation of the rating metrics, user feedback data and fueling station data, the report exported by the data server to one or more external sources.

19. The fueling station management system of claim 1, wherein the user device is not a component of the vehicle.

20. The fueling station management system of claim 1, wherein the user device is not a component of the vehicle.

* * * * *